United States Patent
You

(10) Patent No.: US 12,529,566 B2
(45) Date of Patent: Jan. 20, 2026

(54) VEHICLE AND METHOD OF CONTROLLING THE SAME

(71) Applicants: Hyundai Motor Company, Seoul (KR); Kia Corporation, Seoul (KR)

(72) Inventor: Kyungjin You, Anyang-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 65 days.

(21) Appl. No.: 17/499,461

(22) Filed: Oct. 12, 2021

(65) Prior Publication Data

US 2022/0178707 A1 Jun. 9, 2022

(30) Foreign Application Priority Data

Dec. 7, 2020 (KR) .................. 10-2020-0169615

(51) Int. Cl.
*G01C 21/34* (2006.01)
*G01C 21/36* (2006.01)
*G06Q 10/1093* (2023.01)

(52) U.S. Cl.
CPC ..... *G01C 21/3415* (2013.01); *G01C 21/3461* (2013.01); *G01C 21/3484* (2013.01); *G01C 21/3685* (2013.01); *G01C 21/3691* (2013.01); *G06Q 10/1093* (2013.01)

(58) Field of Classification Search
CPC ............ G01C 21/3415; G01C 21/3461; G01C 21/3484; G01C 21/3685; G01C 21/3691; G06Q 10/1095
See application file for complete search history.

(56) References Cited

U.S. PATENT DOCUMENTS

| | | | |
|---|---|---|---|
| 10,082,793 B1 | 9/2018 | Glaser | |
| 10,222,221 B2 | 3/2019 | Bellotti | |
| 10,775,183 B2 | 9/2020 | Ho | |
| 2010/0114469 A1 | 5/2010 | Chao | |
| 2010/0228473 A1* | 9/2010 | Ranford | G06Q 10/1095 701/465 |
| 2015/0045068 A1* | 2/2015 | Soffer | G01C 21/20 455/456.3 |
| 2016/0148167 A1 | 5/2016 | Li | |
| 2018/0080785 A1* | 3/2018 | Han | G01C 21/3492 |
| 2018/0135989 A1* | 5/2018 | Schreier | G01C 21/3655 |
| 2018/0180430 A1* | 6/2018 | Chokshi | G01C 21/3461 |

(Continued)

FOREIGN PATENT DOCUMENTS

| | | |
|---|---|---|
| EP | 1944724 A1 | 7/2008 |
| JP | 2007163231 A | 6/2007 |

(Continued)

OTHER PUBLICATIONS

KR_20120061206_AI_machine_translation (Year: 2012).*

*Primary Examiner* — Anne Marie Antonucci
*Assistant Examiner* — Patrick M Brady
(74) *Attorney, Agent, or Firm* — Slater Matsil, LLP

(57) ABSTRACT

An embodiment method of controlling a vehicle including receiving a schedule including an appointment time and an appointment place, selecting a guide route having the appointment place as a destination, and changing the schedule or the guide route based on whether the appointment place is reachable within the appointment time, whether the appointment place is changeable, or a vehicle driving condition.

20 Claims, 5 Drawing Sheets

(56) References Cited

U.S. PATENT DOCUMENTS

| | | |
|---|---|---|
| 2019/0289432 A1 | 9/2019 | Yamada |
| 2020/0124425 A1 | 4/2020 | Wengreen et al. |
| 2020/0142407 A1* | 5/2020 | Kozloski ............ G01C 21/3484 |
| 2020/0172114 A1* | 6/2020 | Hamagami ............ G06V 40/10 |

FOREIGN PATENT DOCUMENTS

| | | | | |
|---|---|---|---|---|
| JP | 2015055498 A | | 3/2015 | |
| JP | 2020098449 A | | 6/2020 | |
| KR | 20120061206 A | * | 6/2012 | ......... G01C 21/3691 |

* cited by examiner

VEHICLE AND METHOD OF CONTROLLING THE SAME

CROSS-REFERENCE TO RELATED APPLICATIONS

This application claims the benefit of Korean Patent Application No. 10-2020-0169615, filed on Dec. 7, 2020 in the Korean Intellectual Property Office, which application is hereby incorporated herein by reference.

TECHNICAL FIELD

The disclosure relates to a vehicle and a method of controlling the same.

BACKGROUND

A navigation system of a vehicle is provided to guide a route from the current location to the destination.

However, the current navigation system only focuses on the arrival of the vehicle to the destination, and does not properly respond to a change of the destination, a setting of an intermediate stop, or the like.

Accordingly, there is a need for an optimal route guidance algorithm that considers a case in which an initially set destination is changed while the vehicle is travelling.

SUMMARY

The disclosure relates to a vehicle and a method of controlling the same. Particular embodiments relate to a route guide and a control of travel of a vehicle.

Therefore, an embodiment of the disclosure provides an optimal route guidance algorithm that considers a case in which an initially set destination is changed during travel of a vehicle.

Additional embodiments of the disclosure will be set forth in part in the description which follows and, in part, will be obvious from the description, or may be learned by practice of the disclosure.

According to an embodiment of the disclosure, there is provided a method of controlling a vehicle, the method including receiving a schedule including an appointment time and an appointment place, selecting a guide route having the appointment place as a destination, and changing at least one of the schedule or the guide route based on at least one of whether the appointment place is reachable within the appointment time, whether the appointment place is changeable, or a vehicle driving condition.

When all appointment participants participating in an appointment of the schedule are unable to arrive at the appointment place within the appointment time, a change of the appointment time may be notified to the appointment participants.

When the appointment place is changeable after the notifying of the change of the appointment time, the appointment place may be changed to an alternative destination at which all of the appointment participants are able to arrive within the appointment time, and the guide route may be reset using the changed appointment place as a new destination.

When the appointment place is not changeable after the notifying of the change of the appointment time, the guide route may be reset based on the vehicle driving condition.

The vehicle driving condition may include a driving difficulty of the guide route, a driving skill of a driver, whether the vehicle has an autonomous driving function, and whether the vehicle has a driving assistance function.

The guide route may be reset based on the driving difficulty of the guide route and the driving skill of the driver.

The guide route may be reset based on whether the vehicle has the autonomous driving function, and whether the vehicle has the driving assistance function.

The method may further include guiding a route of the vehicle to a parking lot adjacent to the destination when parking at the destination is not performable.

According to another embodiment of the disclosure, there is provided a vehicle including a navigation system configured to guide a route to a destination, a communicator configured to communicate with a server and a mobile device, and a controller configured to receive a schedule including an appointment time and an appointment place, and select a guide route having the appointment place as a destination, and change at least one of the schedule or the guide route based on at least one of whether the appointment place is reachable within the appointment time, whether the appointment place is changeable, and a vehicle driving condition.

The controller may be configured to, when all appointment participants participating in an appointment of the schedule are unable to arrive at the appointment place within the appointment time, notify a change of the appointment time to the appointment participants.

The controller may be configured to, when the appointment place is changeable after the notifying of the change of the appointment time, change the appointment place to an alternative destination in which all of the appointment participants are able to arrive within the appointment time, and reset the guide route using the changed appointment place as a new destination.

The controller may be configured to, when the appointment place is not changeable after the notifying of the change of the appointment time, reset the guide route based on the vehicle driving condition.

The vehicle driving condition may include a driving difficulty of the guide route, a driving skill of a driver, whether the vehicle has an autonomous driving function, and whether the vehicle has a driving assistance function.

The controller may be configured to reset the guide route based on the driving difficulty of the guide route and the driving skill of the driver.

The controller may be configured to reset the guide route based on whether the vehicle has the autonomous driving function, and whether the vehicle has the driving assistance function.

The controller may be further configured to guide a route of the vehicle to a parking lot adjacent to the destination when parking at the destination is not performable.

According to another embodiment of the disclosure, there is provided a method of controlling a vehicle, the method including receiving a schedule including an appointment time and an appointment place, selecting a guide route having the appointment place as a destination, and changing at least one of the schedule or the guide route based on at least one of whether the appointment place is reachable within the appointment time, whether the appointment place is changeable, a driving difficulty of the guide route, a driving skill of a driver, whether the vehicle has an autonomous driving function, or whether the vehicle has a driving assistance function.

According to another embodiment of the disclosure, there is provided a vehicle including a navigation system configured to guide a route to a destination, a communicator configured to communicate with a server and a mobile device, and a controller configured to receive a schedule including an appointment time and an appointment place, and select a guide route having the appointment place as a destination, and change at least one of the schedule or the guide route based on at least one of whether the appointment place is reachable within the appointment time, whether the appointment place is changeable, a driving difficulty of the guide route, a driving skill of a driver, whether the vehicle has an autonomous driving function, or whether the vehicle has a driving assistance function.

BRIEF DESCRIPTION OF THE DRAWINGS

These and/or other embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Figure 1:
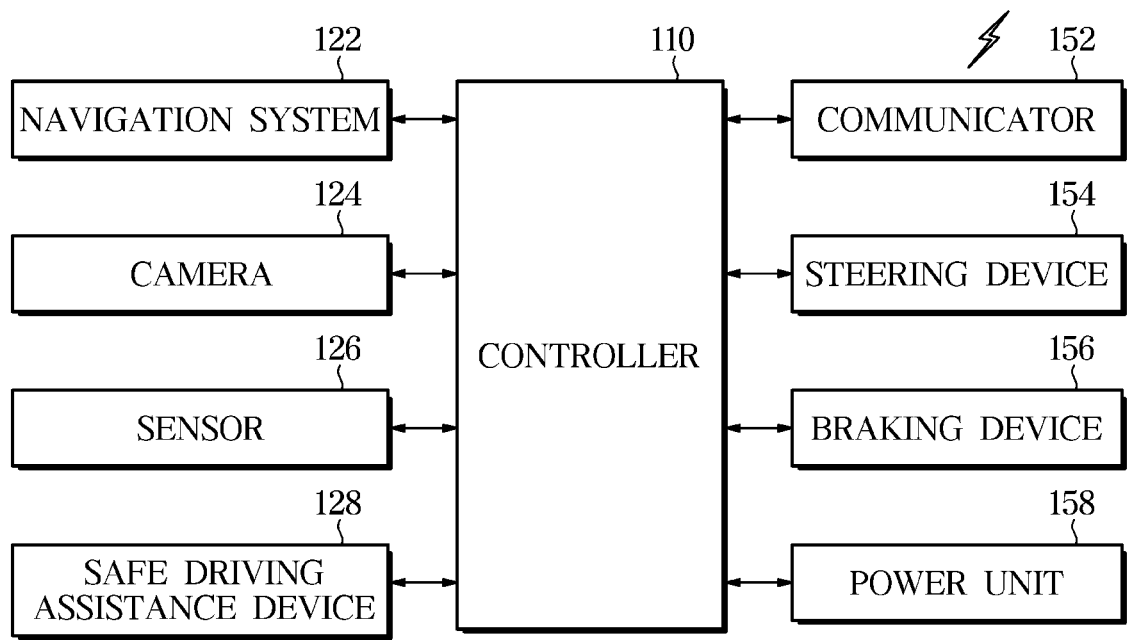
FIG. 1 is a diagram illustrating a control system of a vehicle according to an embodiment of the disclosure.

FIG. 1 is a diagram illustrating a control system of a vehicle according to an embodiment of the disclosure.

Referring to FIG. 1, a controller 110 is communicatively connected with a navigation system 122, a camera 124, a sensor 126, a safe driving assistance device 128, a communicator 152, a steering device 154, a braking device 156, and a power unit 158.

The controller 110 may be an electronic control unit provided in the vehicle.

The navigation system 122 is provided to guide a route from the current place to the destination. The navigation system 122 suggests various routes to the destination and allows one of the routes to be selected. The selection of the route may be performed by the controller 110 or a user (a driver).

The camera 124 and the sensor 126 are provided to acquire information about surroundings of the vehicle for autonomous driving. The camera 124 may include a front camera for photographing the front of the vehicle and an around-view camera for photographing the surroundings of the vehicle. The sensor 126 may be a RADAR or a LiDAR.

The safe driving assistance device 128 is a generic term referring to a device for assisting a driver so that the vehicle safely travels, such as a lane keeping assistant, a cruise control system, and a parking assistance system.

The communicator 152 is provided to communicate with a server at a remote site or mobile device. The server may be a server provided in a telematics center or a server of a vehicle sharing service provider. The mobile device may be a mobile device that is registered in the server by the user of the vehicle.

The steering device 154 is provided to control the traveling direction of the vehicle. The braking device 156 is provided for decelerating and stopping the vehicle. The power unit 158 includes an engine and a transmission, and is provided to generate power required for the vehicle to travel.

Figure 2:
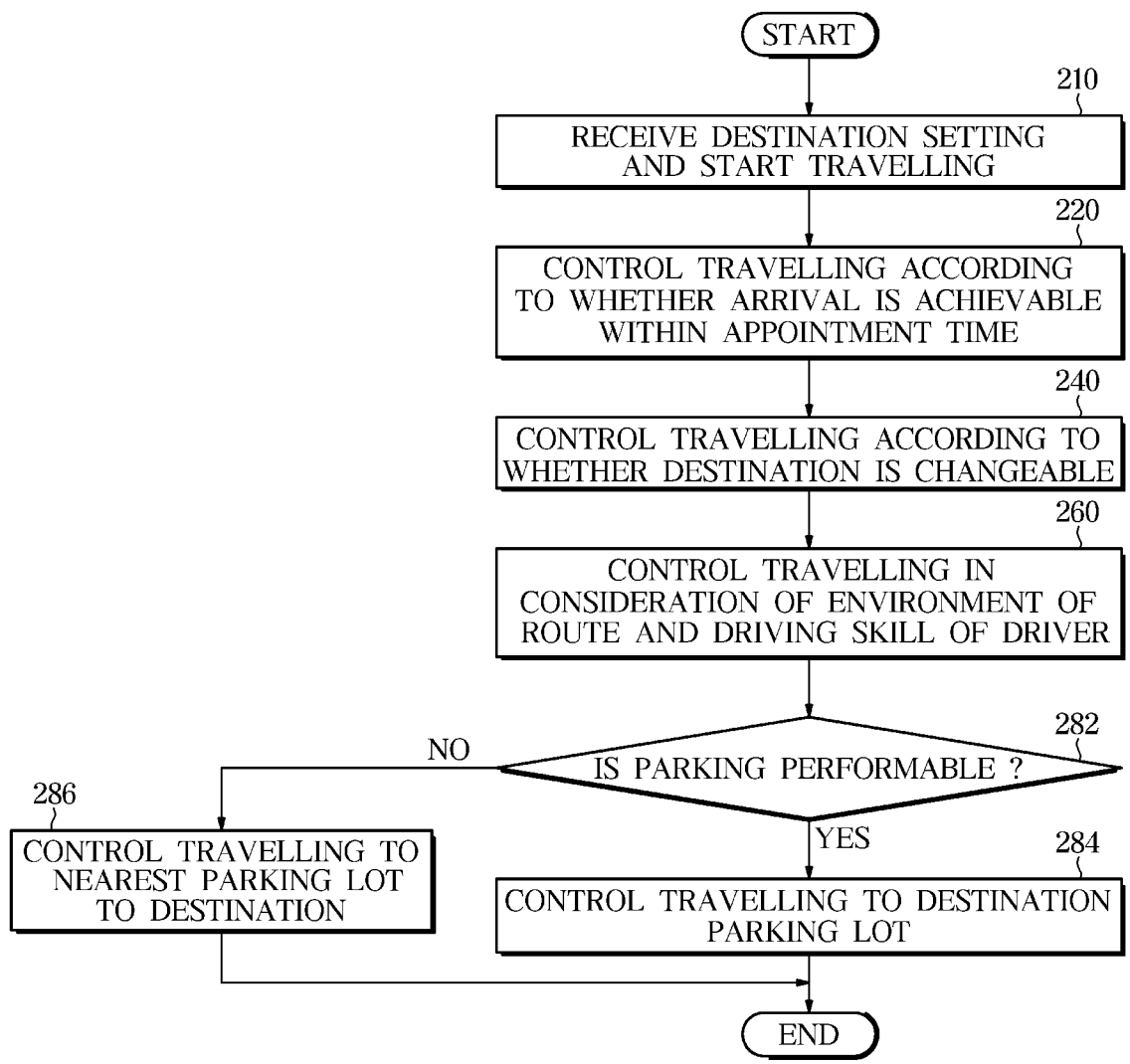
FIG. 2 is a diagram showing a method of controlling a vehicle according to an embodiment of the disclosure.

FIG. 2 is a diagram illustrating a method of controlling a vehicle according to an embodiment of the disclosure. The method of controlling the vehicle shown in FIG. 2 assumes a case in which a plurality of appointment participants have made an appointment to meet at a specific time at a specific place, and move to the appointment place by vehicles, but some of the plurality of appointment participants board a vehicle at a place other than the departure point. To this end, a destination (an appointment place) is input into the navigation system 122 from the departure point to receive a route guidance so that a basic schedule is provided to move along a route guided by the navigation system 122, but while travelling to the destination according to the guidance of the navigation system 122, the destination or intermediate route is allowed to be changed as needed, in consideration of 'whether the arrival is achievable within an appointment time', 'whether the destination is changeable', and 'the environment of the travelling route and the driving skill of the driver' for optimal operation corresponding to the travelling situation.

Referring to FIG. 2, first, the controller 110 receives a destination setting through the navigation system 122, and starts travelling along a route to the set destination (210). Next, the controller 110 determines whether the arrival at the destination (the appointment place) is achievable within the appointment time based on the route guidance of the navigation system 122, and controls travelling of the vehicle according to the determination result (220). In addition, when it is determined that arrivals of the appointment participants at the destination are not achievable within the appointment time, the controller 110 determines whether the destination is changeable, and controls the travelling of the vehicle according to the determination result (240). In addition, the controller 110 controls the travelling of the vehicle in consideration of the environment of the travelling route and the driving skill of the driver according to whether the destination is changeable (260). The driving skill of the driver is determined from the result of evaluating the usual driving habits of the driver. For example, the driving skill of the driver may be evaluated by acquiring information about starting, stopping, acceleration, and average speed of the driver through a recording device usually provided inside or outside the vehicle.

Operations 220, 240, and 260 of FIG. 2 do not need to be performed or do not need to be sequentially performed, and operation 240 or 260 may be omitted as needed. For example, when the arrivals at the destination are achievable within the appointment time in operation 220, operations 240 and 260 may be omitted and operation 282 may be directly proceeded. In addition, one or more of operations 220, 240, and 260 may be repeatedly performed several times regardless of the order.

When a parking space is secured at the destination and parking is performable (YES in operation 282), the controller 110 controls the vehicle to travel to the parking lot of the destination (284). On the other hand, when parking is not performable because a parking space is not secured at the destination (NO in operation 282), the controller 110 searches for the nearest parking lot around the destination in cooperation of the navigation system 122 and controls the vehicle to travel to the found parking lot (286).

Figure 3:
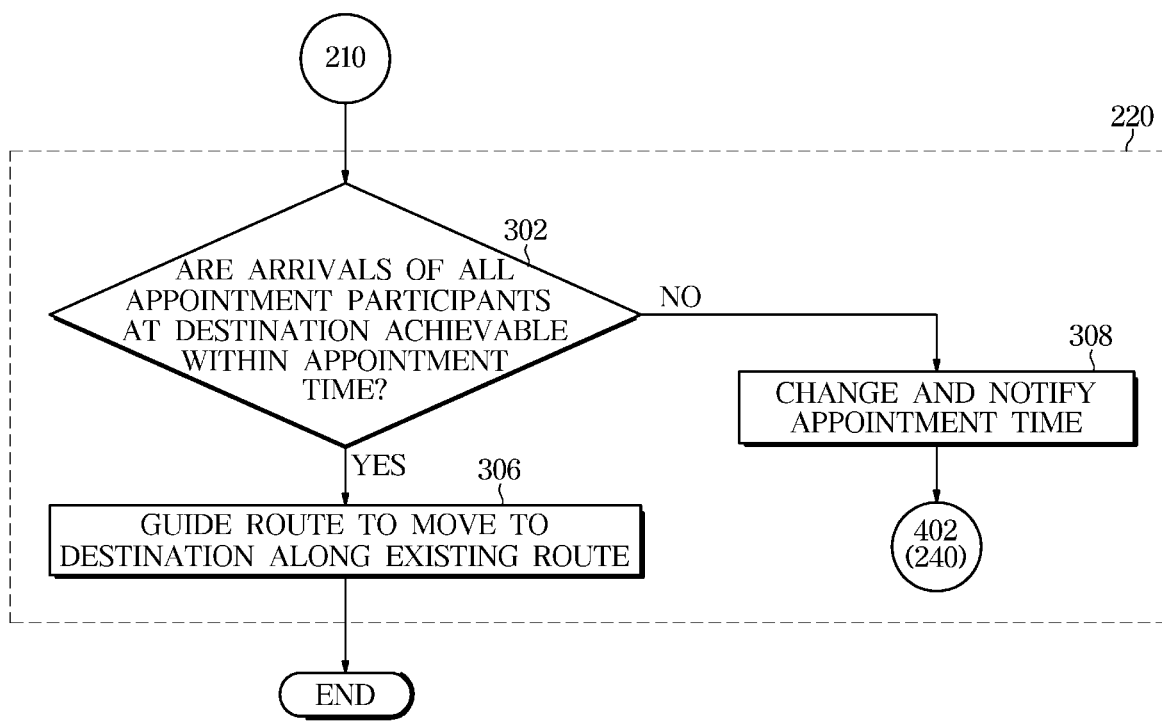
FIG. 3 is a diagram specifically illustrating 'a control of travel according to whether arrivals are achievable within an appointment time' in the method of controlling the vehicle shown in FIG. 2.

FIG. 3 is a diagram specifically illustrating 'a control of travel according to whether arrivals are achievable within an appointment time' in the method of controlling the vehicle shown in FIG. 2.

Referring to FIG. 3, after starting travelling along the route to the set destination (210), the controller 110 checks whether arrivals of all appointment participants at the destination are achievable within the appointment time (302). Here, the appointment participants refer to a party of people on the driver's side who move to the same appointment place as the driver of the vehicle. Checking whether all the appointment participants may arrive at the destination within the appointment time may be implemented through communication with a mobile device carried by each appointment participant. An application for schedule management is installed in the mobile device. Through the schedule management application, users may communicate with each other, exchange information, and change schedules according to an embodiment of the disclosure.

When arrivals of all of the appointment participants at the destination are achievable within the appointment time (YES in operation 302), the controller 110 moves to the destination along the initial route set in operation 210 of FIG. 2 (306). That is, when all of the appointment participants may arrive at the destination within the appointment time, a movement is performed to the destination along the initial route guided by the navigation system 122.

When arrivals of all of the appointment participants at the destination are not achievable within the appointment time (NO in operation 302), the controller 110 changes the appointment time to a time in which all of the appointment participants may arrive at the appointment place, and notifies all the appointment participants of the changed appointment time (308).

Next, the controller 110 proceeds to 'control of travel according to whether the destination is changeable (240)' shown in FIG. 2. The operation of 'control of travel according to whether the destination is changeable' shown in FIG. 2 will be described in detail with reference to FIG. 4 below.

Figure 4:
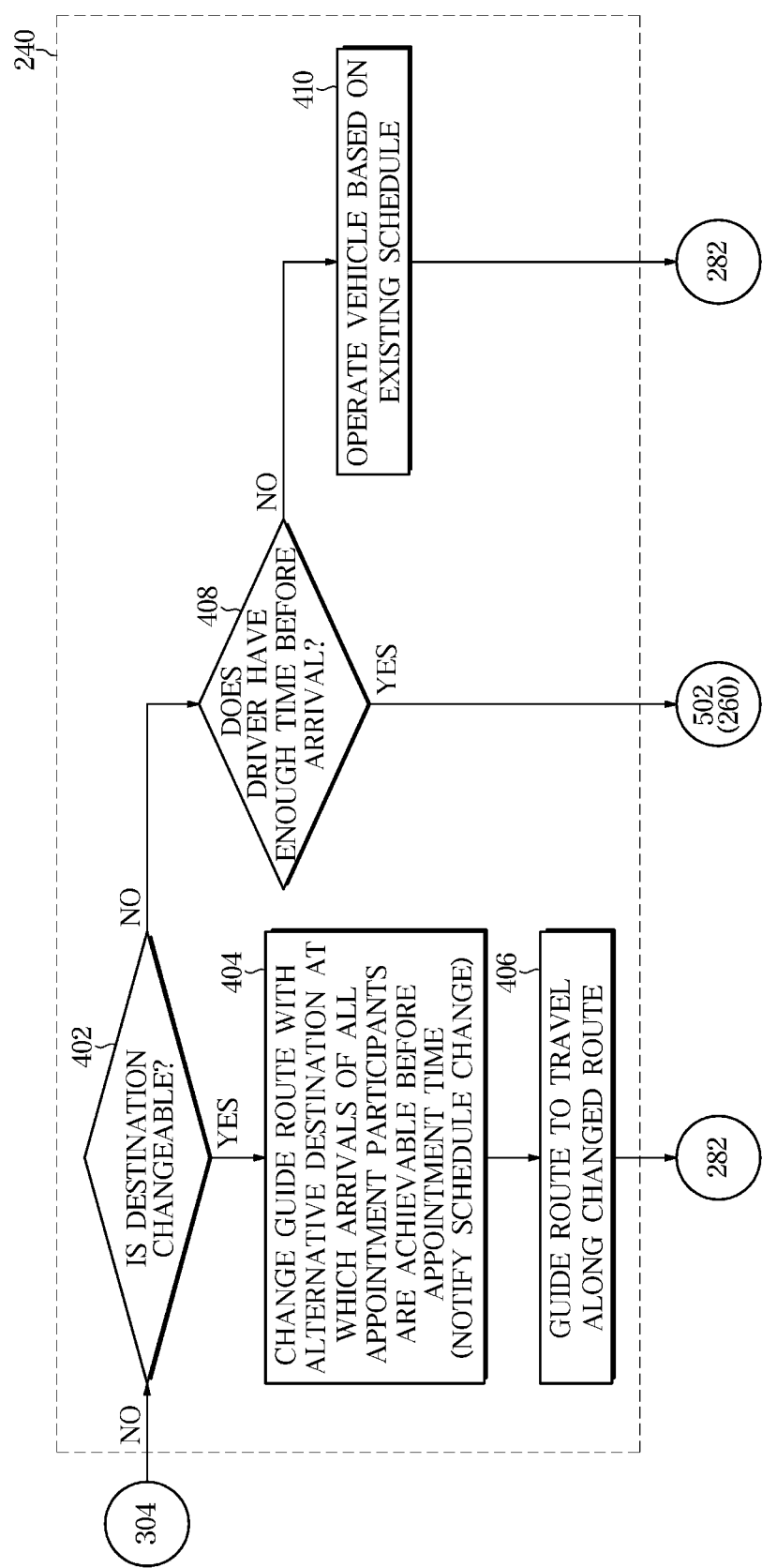
FIG. 4 is a diagram specifically illustrating 'a control of travel according to whether a destination is changeable' in the method of controlling the vehicle shown in FIG. 2.

FIG. 4 is a diagram specifically illustrating 'a control of travel according to whether a destination is changeable' in the method of controlling the vehicle shown in FIG. 2.

Referring to FIG. 4, when a result of the checking in operation 302 of FIG. 3 is that arrivals of all of the appointment participants at the destination are not achievable within the appointment time (NO in operation 302), the controller 110 performs a change of the appointment time and a notification of the changed appointment time, and checks whether the destination set in operation 210 of FIG. 2 is changeable (402). That is, when arrivals of all of the appointment participants at the destination are not achievable within the appointment time, an attempt to change the destination may be performed such that all of the appointment participants meet within the appointment time.

When the destination is changeable to another place without sticking to the destination initially set in operation 210 of FIG. 2 (YES in operation 402), the controller 110 changes the existing destination set in advance to another new alternative destination at which all of the appointment participants may arrive before the appointment time, and also changes the existing route to a route to the new alternative destination (404). In addition, the controller 110 guides the route so that the vehicle travels along the new route to the changed new alternative destination (406). After operation 406, the process proceeds to operation 282 of FIG. 2 described above.

In operation 408, when the driver of the vehicle has enough time to arrive within the appointment time (YES in operation 408), the controller 110 proceeds with 'the control (260) of the travelling according to the environment of the route and the driving skill of the driver' of FIG. 2. The 'control (260) of the travelling according to of the environment of the route and the driving skill of the driver' of FIG. 2 will be described in detail with reference to FIG. 5.

In operation 408, when the driver of the vehicle does not have enough time to arrive within the appointment time (NO in operation 408), the controller 110 guides the route for the vehicle to travel based on the existing schedule (the appointment time, the destination, the route, etc.) (410).

Figure 5:
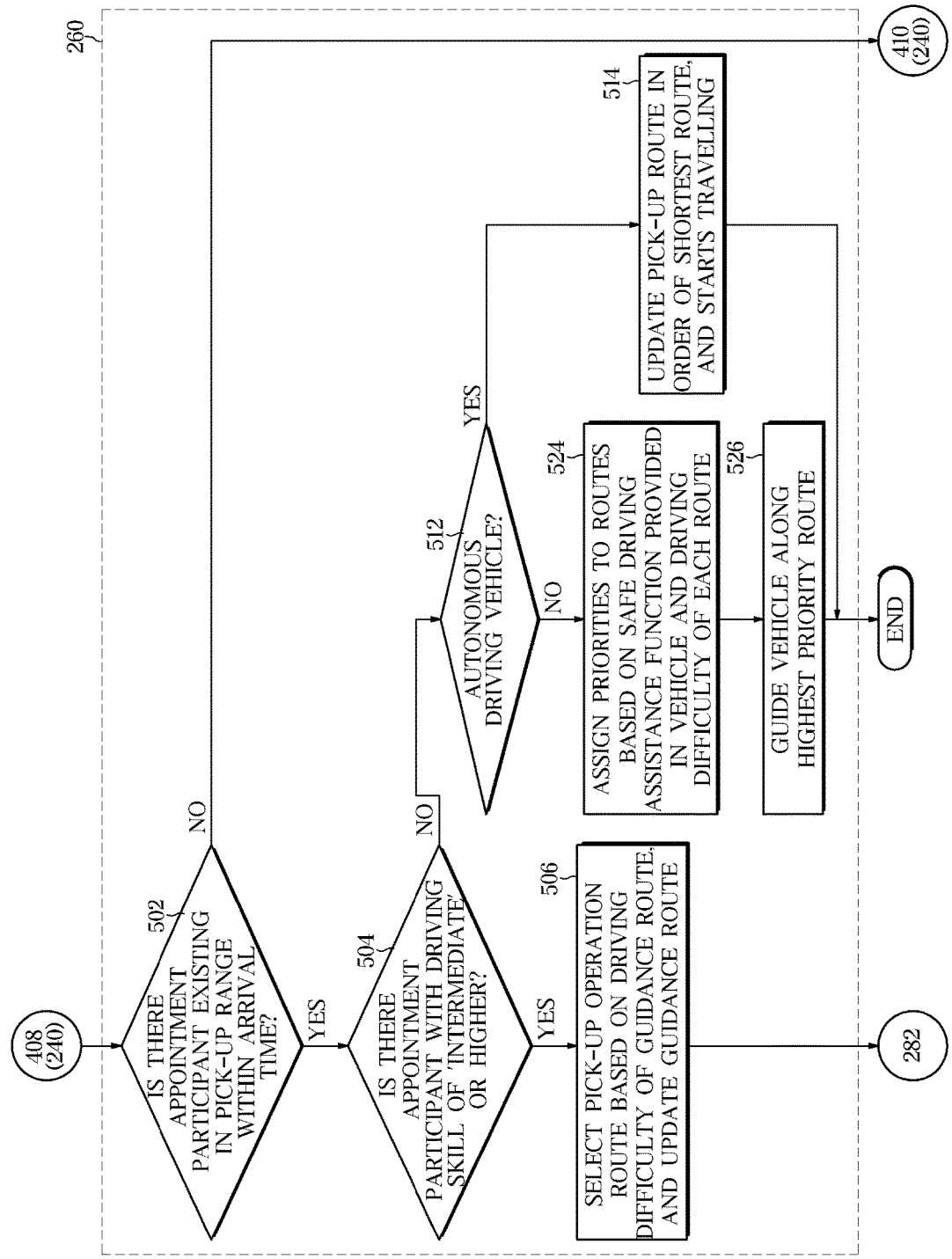
FIG. 5 is a diagram specifically illustrating 'a control of travel according to a route environment and a driver skill' in the method of controlling the vehicle shown in FIG. 2.

FIG. 5 is a diagram specifically illustrating 'a control (260) of travel according to an environment of a route and a driving skill of a driver' in the method of controlling the vehicle shown in FIG. 2. In particular, the method of controlling the vehicle shown in FIG. 5 illustrates a case in which a driver currently driving the vehicle picks up other appointment participants in the middle of the route to the destination when the driver has enough time to arrive within the appointment time.

Referring to FIG. 5, in operation 408 of FIG. 4, when the driver has enough time to arrive within the appointment time (YES in operation 408), the controller 110 proceeds with 'control (260) of the travelling according to of the environment of the route and the driving skill of the driver' of FIG. 2 (502).

In FIG. 5, when there is an appointment participant existing within a pick-up range within the appointment time among the appointment participants (YES in operation 502), the controller 110 checks the driving skill of each appointment participant through the applications of the mobile devices of the appointment participants, and checks whether there is an appointment participant with a driving skill of 'intermediate' or higher (504). Here, the driving skill of 'intermediate' or higher represents a driving skill of 'high' or 'intermediate' when the driving skill is divided into 'high', 'intermediate', and 'low'. The driving skill of the driver may be determined based on at least one of a plurality of criteria, such as an elapsed period from obtaining the driver's license to the present, an accumulated driving distance of the vehicle from the present to the past for a certain period of time, whether the driver has an accident-free driving history, the number of accidents caused by the driver (upon determining that the driver has had an accident), and whether the driver has completed an education of a driving school. The driving skill of each appointment participant may be input and shared through the application on the mobile device. The driving skills are not limited to 'high', 'intermediate', and 'low', and may be divided into 1, 2, 3, . . . and 10, or A, B, C, D, etc. The driving skill of the driver is determined from the result of evaluating the driver's usual driving habits. For example, the driving skill of the driver may be evaluated by acquiring information, such as starting, stopping, acceleration, and average speed of the driver, through a recording device usually provided inside or outside the vehicle.

When there is an appointment participant with a driving skill of 'intermediate' or higher (YES in operation 504), the controller 110 selects a pick-up travel route based on the driving difficulty of the currently set guide route, and updates the guide route as needed (506). That is, when a plurality of appointment participants exists, the guide routes for picking up the appointment participants are also provided in plural. In this case, the driving difficulty is classified based on the road condition of each of the plurality of guide routes, and the guide route for a pick-up is updated in the order of the guide route having the lowest driving difficulty. The driving difficulty of the guide route may be evaluated based on, for example, the slope or curvature of the route, the number of intersections, the frequency of accidents, and the like. A specific route having a high slope section or a route where a slope section frequently appears even though the slope is low is classified as a route having a high driving difficulty. In addition, a guide route having a great curvature, such as in a road of a mountainous area, is classified as a route with a high driving difficulty. In addition, a route having a number of railroad crossings or bridges is classified as a route with a high driving difficulty. In addition, when a specific route has an accident-prone area, particularly, a fatal accident-prone area, the guide route is classified as a route with a high driving difficulty. When presenting a guide route for a pick-up, it is preferable to prioritize a route that may be driven safely due to a low driving difficulty rather than a route with a high driving difficulty. When the update and selection of the guide route for a pick-up are completed, the controller 110 proceeds to operation 282 of FIG. 2 described above while guiding the vehicle to travel along the corresponding route. While travelling along the guide route for a pick-up, appointment participants may be picked up.

In operation 504, when there is no appointment participant having a driving skill of 'intermediate' or higher (NO in operation 504), the controller 110 checks whether the corresponding vehicle is a vehicle having an autonomous driving function (system) (512). Here, the autonomous driving function may be an autonomous driving level (level 3) or higher.

When the corresponding vehicle is a vehicle with an autonomous driving function (YES in operation 512), the controller 110 updates the pick-up route in the order of the shortest route, and starts travelling for a pick-up through the shortest route (514). Since the vehicle, which has an autonomous driving function of level 3 or higher, may travel depending on the autonomous driving function, it is desirable to prioritize the shortest route without considering the driving difficulty of the travelling route.

Conversely, when the corresponding vehicle is a vehicle not equipped with an autonomous driving function (NO in operation 512), the controller 110 assigns priorities to the plurality of routes based on the safe driving assistance function (system) provided in the vehicle and the driving difficulty (524). That is, a higher priority may be assigned to a higher level of safety driving assistance function (or more assistant functions) provided in the vehicle and a lower level of driving difficulty for each route. When the vehicle is not equipped with a safe driving assistance function, priorities may be sequentially given to travel routes based on the driving difficulty of the route. The safe driving assistance function may include, for example, a cruise control function (system), a lane keeping assistant function (system), and a collision avoidance function (system).

When the priority for each of the plurality of travel routes is determined, the controller 110 guides the vehicle to travel along the highest priority route with the highest priority (526).

As is apparent from the above, an optimal route guidance algorithm is provided in consideration of a case in which an initially set destination is changed during travel of a vehicle.

The above description of embodiments of the present disclosure is for illustrative purposes, and a person having ordinary skill in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. A method of controlling a vehicle, the method comprising:
    receiving, by a communicator, a schedule including an appointment time and an appointment place of an appointment;
    selecting, by a navigation system or a user, a guide route having the appointment place as a destination;
    changing, by a controller, the schedule or the guide route based on whether the appointment place is reachable within the appointment time, whether the appointment place is changeable, or a vehicle driving condition;
    determining, by the controller, that a first appointment participant of a plurality of appointment participants participating in the appointment is unable to arrive at the appointment place within the appointment time;
    notifying, by the controller, the plurality of appointment participants of a change of the appointment time;
    determining, by the controller, that the appointment place is not changeable after notifying the plurality of appointment participants of the change of the appointment time;
    resetting, by the controller, the guide route based on the vehicle driving condition, wherein the vehicle driving condition comprises a driving difficulty of the guide route, a skill of a driver, whether or not the vehicle has an autonomous driving function, or whether the vehicle has a driving assistance function; and
    moving the vehicle to the appointment place along the guide route, wherein the vehicle is moved autonomously in response to the vehicle having the autonomous driving function and wherein the vehicle is moved under user control in response to the vehicle not having the autonomous driving function,
    wherein when a second appointment participant is within a pick-up range within the appointment time among the plurality of appointment participants, selecting a new guide route to pick up the second appointment participant according to the skill of the driver and the driving difficulty of a currently set guide route, and updating the currently set guide route to the new guide route,
    wherein the skill of the driver is determined based on at least one of a plurality of criteria that comprises an elapsed time period since the driver obtained a driver's license, an accumulated driving distance of the vehicle for a certain period of time, whether the driver has an accident-free driving history, a number of accidents caused by the driver, and whether the driver has completed an education of driving school,
    wherein the driving difficulty of the guide route is evaluated based on at least one of a plurality of criteria that comprises a slope or curvature of the guide route, a number of intersections on the guide route, and a frequency of accidents on the guide route,
    wherein the resetting of the guide route is based on the autonomous driving function in response to the skill of the driver being lower than a predetermined value and the vehicle having the autonomous driving function, and wherein the resetting of the guide route is based on the driving difficulty of the guide route in response to the skill of the driver being lower than the predetermined value and the vehicle lacking the autonomous driving function.

2. The method of claim 1, further comprising:
determining that the appointment place is changeable after notifying the plurality of appointment participants of the change of the appointment time;
changing the appointment place to an alternative destination at which the appointment participants are able to arrive within the appointment time; and
resetting the guide route using the changed appointment place as a new destination.

3. The method of claim 1, wherein resetting the guide route is based on the driving difficulty of the guide route and the skill of the driver.

4. The method of claim 1, wherein resetting the guide route is based on whether the vehicle has the autonomous driving function and whether the vehicle has the driving assistance function.

5. The method of claim 1, further comprising:
determining that parking at the destination is not performable; and
guiding a route of the vehicle to a parking lot adjacent to the destination in response to determining that the parking at the destination is not performable.

6. The method of claim 1, wherein the vehicle has the autonomous driving function, the method further comprising controlling the vehicle to travel to the appointment place along the reset guide route.

7. The method of claim 6, further comprising:
determining that parking at the appointment place is not performable; and
controlling the vehicle to travel to a parking lot adjacent to the appointment place in response to determining that parking at the appointment place is not performable.

8. A vehicle comprising:
a navigation system configured to guide a route to a destination;
a communicator configured to communicate with a server at a remote site and a mobile device; and
a controller configured to:
receive a schedule including an appointment time and an appointment place through the communicator;
select a guide route having the appointment place as the destination;
change the schedule or the guide route based on whether the appointment place is reachable within the appointment time, whether the appointment place is changeable, or a vehicle driving condition;
notify a change of the appointment time to appointment participants participating in an appointment of the schedule in response to an appointment participant being unable to arrive at the appointment place within the appointment time;
reset the guide route based on the vehicle driving condition in response to the appointment place not being changeable after notification of the change of the appointment time, wherein the vehicle driving condition comprises a driving difficulty of the guide route, a skill of a driver, whether or not the vehicle has an autonomous driving function, or whether the vehicle has a driving assistance function, wherein the guide route is reset based on the autonomous driving function in response to the skill of the driver being lower than a predetermined value and the vehicle having the autonomous driving function, and wherein the guide route is reset based on the driving difficulty of the guide route in response to the skill of the driver being lower than the predetermined value and the vehicle lacking the autonomous driving function; and
cause the vehicle to move to the appointment place along the guide route, wherein the vehicle is moved autonomously in response to the vehicle having the autonomous driving function and wherein the vehicle is moved under user control in response to the vehicle not having the autonomous driving function,
wherein when an additional appointment participant is within a pick-up range within the appointment time among the appointment participants, the controller is further configured to select a new guide route to pick up the additional appointment participant according to the skill of the driver and the driving difficulty of a currently set guide route, and update the currently set guide route to the new guide route for pick up,
wherein the skill of the driver is determined based on at least one of a plurality of criteria that comprises an elapsed time period since the driver obtained a driver's license, an accumulated driving distance of the vehicle for a certain period of time, whether the driver has an accident-free driving history, a number of accidents caused by the driver, and whether the driver has completed an education of driving school, and
wherein the driving difficulty of the guide route is evaluated based on at least one of a plurality of criteria that comprises a slope or curvature of the guide route, a number of intersections on the guide route, and a frequency of accidents on the guide route.

9. The vehicle of claim 8, wherein the controller is configured to:
change the appointment place to an alternative destination in which the appointment participants are able to arrive within the appointment time in response to the appointment place being changeable after the notification of the change of the appointment time; and
reset the guide route using the changed appointment place as a new destination.

10. The vehicle of claim 8, wherein the controller is configured to reset the guide route based on the driving difficulty of the guide route and the skill of the driver.

11. The vehicle of claim 8, wherein the controller is configured to reset the guide route based on whether the vehicle has the autonomous driving function and whether the vehicle has the driving assistance function.

12. The vehicle of claim 8, wherein the controller is further configured to guide a route of the vehicle to a parking lot adjacent to the destination in response to parking at the destination not being performable.

13. The vehicle of claim 8, wherein the vehicle driving condition comprises the driving difficulty of the guide route and the skill of the driver.

14. The vehicle of claim 8, wherein the vehicle has the autonomous driving function and wherein the autonomous friving function of the vehicle is configured to control the vehicle to travel to the appointment place along the reset guide route.

15. The vehicle of claim 14, wherein the autonomous driving function a is further configured to control the vehicle to travel to a parking lot adjacent to the appointment place in response to determining that parking at the appointment place is not performable.

16. A method of controlling a vehicle, the method comprising:
    receiving, by a communicator on the vehicle, a schedule including an appointment time and an appointment place, the vehicle having an autonomous driving function;
    selecting, by a navigation system on the vehicle or a user in the vehicle, a guide route having the appointment place as a destination;
    changing, by a controller on the vehicle, the schedule or the guide route based on a vehicle driving condition, whether the appointment place is reachable within the appointment time, and whether the appointment place is changeable, wherein the vehicle driving condition comprises a driving difficulty of the guide route, wherein the driving difficulty of the guide route is evaluated based on at least one of a plurality of criteria that comprises a slope or curvature of the guide route, a number of intersections on the guide route, and a frequency of accidents on the guide route;
    determining, by the controller, that a first appointment participant of a plurality of appointment participants participating in an appointment of the schedule is unable to arrive at the appointment place within the appointment time;
    notifying, by the controller, the plurality of appointment participants of a change of the appointment time;
    determining, by the controller, that the appointment place is not changeable after notifying the plurality of appointment participants of the change of the appointment time;
    resetting, by the controller, the guide route based on the autonomous driving function in response to a skill of a driver being lower than a predetermined value;
    selecting, by the controller, a new guide route to pick up a second appointment participant when the second appointment participant is within a pick-up range within the appointment time among the plurality of appointment participants;
    updating, by the controller, a currently set guide route to the new guide route; and
    autonomously moving the vehicle to the appointment place along the new guide route.

17. The method of claim 16, further comprising:
    determining that an appointment participant of the plurality of appointment participants participating in an appointment of the schedule is unable to arrive at the appointment place within the appointment time; and
    notifying the plurality of appointment participants of a change of the appointment time.

18. The method of claim 16, further comprising:
    determining that the appointment place is changeable after notifying the plurality of appointment participants of the change of the appointment time;
    changing the appointment place to an alternative destination at which the appointment participants are able to arrive within the appointment time; and
    resetting the guide route using the changed appointment place as a new destination.

19. The method of claim 16, wherein the vehicle has the autonomous driving function, the method further comprising controlling the vehicle to travel to the appointment place along the reset guide route.

20. The method of claim 19, further comprising:
    determining that parking at the appointment place is not performable; and
    controlling the vehicle to travel to a parking lot adjacent to the appointment place in response to determining that parking at the appointment place is not performable.

* * * * *